US010933873B2

(12) United States Patent
Park et al.

(10) Patent No.: US 10,933,873 B2
(45) Date of Patent: Mar. 2, 2021

(54) APPARATUS AND METHOD FOR SHIFT CONTROL IN VEHICLE

(71) Applicants: HYUNDAI MOTOR COMPANY, Seoul (KR); KIA MOTORS CORPORATION, Seoul (KR)

(72) Inventors: Sang Jun Park, Seoul (KR); Byeong Wook Jeon, Seoul (KR); Kwang Hee Park, Suwon-si (KR); Jae Chang Kook, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/576,142

(22) Filed: Sep. 19, 2019

(65) Prior Publication Data
US 2020/0361467 A1    Nov. 19, 2020

(30) Foreign Application Priority Data
May 13, 2019  (KR) .................. 10-2019-0055546

(51) Int. Cl.
*F16D 48/06*     (2006.01)
*B60W 30/18*    (2012.01)
*B60W 50/06*    (2006.01)
*B60W 50/00*    (2006.01)

(52) U.S. Cl.
CPC ...... *B60W 30/18072* (2013.01); *B60W 50/06* (2013.01); *B60W 2030/1809* (2013.01); *B60W 2050/0011* (2013.01); *B60W 2540/103* (2013.01); *B60W 2710/021* (2013.01); *B60W 2710/1005* (2013.01); *F16D 48/066* (2013.01); *F16D 2500/108* (2013.01); *F16D 2500/10412* (2013.01); *F16D 2500/31453* (2013.01)

(58) Field of Classification Search
CPC .......... B60W 30/18072; B60W 50/06; B60W 2540/103; B60W 2050/0011; B60W 2030/1809; B60W 2710/021; B60W 2710/1005; F16D 48/066; F16D 2500/108; F16D 2500/31453; F16D 2500/10412
See application file for complete search history.

(56) References Cited

U.S. PATENT DOCUMENTS

| 6,923,870 B2* | 8/2005 | Muhr-Sweeney ........ B08B 1/00 134/6 |
| 2016/0084376 A1* | 3/2016 | Kim .................... F16H 61/0213 701/51 |
| 2019/0111929 A1* | 4/2019 | Park ...................... B60W 10/11 |

FOREIGN PATENT DOCUMENTS

| JP | 2010-169128 A | 8/2010 |
| JP | 2010-274788 A | 12/2010 |
| KR | 10-2008-0040397 A | 5/2008 |

* cited by examiner

*Primary Examiner* — David J Hlavka
(74) *Attorney, Agent, or Firm* — Morgan, Lewis & Bockius LLP (57) ABSTRACT

An apparatus for shift control in a vehicle includes: a transmission; an acceleration apparatus; and a control circuit electrically connected with the transmission and the acceleration apparatus. The control circuit shifts the transmission from a drive state to a neutral state when an activation condition for coasting is satisfied during travel of the vehicle, and corrects an oil pressure for release of a clutch in the transmission at the time of a kickdown shift, when a driver's input for kickdown is detected through the acceleration apparatus during the coasting.

18 Claims, 8 Drawing Sheets

APPARATUS AND METHOD FOR SHIFT CONTROL IN VEHICLE

CROSS-REFERENCE TO RELATED APPLICATION

This application claims the benefit of priority to Korean Patent Application No. 10-2019-0055546, filed in the Korean Intellectual Property Office on May 13, 2019, the entire contents of which are incorporated herein by reference.

TECHNICAL FIELD

The present disclosure relates to an apparatus and a method for controlling a gearshift that occurs during a neutral coasting control of a vehicle.

BACKGROUND

A vehicle may coast by inertia when a driver does not apply an input to an accelerator pedal or a brake pedal during travel of the vehicle. During the coasting, the vehicle may rotate an engine in a fuel-cut state by using the inertia of the vehicle without injecting fuel. However, while the engine is rotated by the inertia of the vehicle, the engine may act as running resistance that consumes the kinetic energy of the vehicle.

The vehicle, when coasting, may perform a neutral coasting control to shift a transmission to a neutral state N by releasing a clutch in the transmission while a selector lever is maintained in a drive state D. When the vehicle performs the neutral coasting control, the running resistance of the vehicle may be decreased, and therefore, the distance that the vehicle can move by the coasting may be increased. Accordingly, the fuel economy of the vehicle may be improved by using the neutral coasting control.

SUMMARY

The neutral coasting control may improve the fuel economy, but has a disadvantage of low acceleration responsiveness because, when accelerated again, the vehicle is accelerated after the transmission is shifted from the neutral state N to the drive state D. Especially, when the driver uses kickdown during the neutral coasting control, the acceleration responsiveness may be further deteriorated because the transmission has to downshift to a lower gear after the shift of the transmission from the neutral state N to the drive state D.

The present disclosure has been made to solve the above-mentioned problems occurring in the prior art while advantages achieved by the prior art are maintained intact.

An aspect of the present disclosure provides a shift control apparatus and method for improving acceleration responsiveness by correcting control of an oil pressure when a kickdown shift occurs by an input of a driver during neutral coasting control.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for shift control in a vehicle includes: a transmission; an acceleration apparatus; and a control circuit electrically connected with the transmission and the acceleration apparatus. The control circuit shifts the transmission from a drive state to a neutral state when an activation condition for coasting is satisfied during travel of the vehicle, and corrects an oil pressure for release of a clutch in the transmission at the time of a kickdown shift, when a driver's input for kickdown is detected through the acceleration apparatus during the coasting.

The control circuit may determine whether the input to the acceleration apparatus is an operation for the kickdown, based on an input pattern for the acceleration apparatus.

The control circuit may change a bit for determining whether to correct the oil pressure, when the input for the kickdown is detected during the coasting.

The control circuit may correct the oil pressure to reduce a shift time when performing the kickdown shift.

The control circuit may adjust the oil pressure to be different from an oil pressure for kickdown when the coasting is deactivated.

According to an embodiment, the control circuit may correct the oil pressure to be lower than a specified level, when performing the kickdown shift.

The control circuit may correct a control duty for control of the oil pressure to be lower than a specified level, when performing the kickdown shift.

The control circuit may prohibit learning associated with the kickdown, when the input for the kickdown is detected during the coasting.

The control circuit may correct the oil pressure at a shift synchronization point after performing the kickdown shift.

The control circuit may correct a control duty for control of the oil pressure to be higher than a specified level at a shift synchronization point, after performing the kickdown shift.

The control circuit may correct a target turbine RPM variation and a Proportional-Integral-Derivative (PID) control gain for feedback control at a shift synchronization point, after performing the kickdown shift.

According to another aspect of the present disclosure, a method for shift control in a vehicle includes: shifting a transmission from a drive state to a neutral state when an activation condition for coasting is satisfied during travel of the vehicle; and correcting an oil pressure for release of a clutch in the transmission at the time of a kickdown shift, when a driver's input for kickdown is detected through an acceleration apparatus during the coasting.

The method may further include determining whether the input to the acceleration apparatus is an operation for the kickdown, based on an input pattern for the acceleration apparatus.

The correcting an oil pressure may include correcting the oil pressure to reduce a shift time when performing the kickdown shift.

The correcting an oil pressure may include adjusting the oil pressure to be different from oil pressure for kickdown when the coasting is deactivated.

The correcting an oil pressure may include correcting the oil pressure to be lower than a specified level, when performing the kickdown shift.

The correcting an oil pressure may include correcting a control duty for control of the oil pressure to be lower than a specified level, when performing the kickdown shift.

The method may further include prohibiting learning associated with the kickdown, when the input for the kickdown is detected during the coasting.

The method may further include correcting the oil pressure at a shift synchronization point after performing the kickdown shift.

The method may further include correcting a target turbine RPM variation and a Proportional-Integral-Derivative (PID) control gain for feedback control at a shift synchronization point, after performing the kickdown shift.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
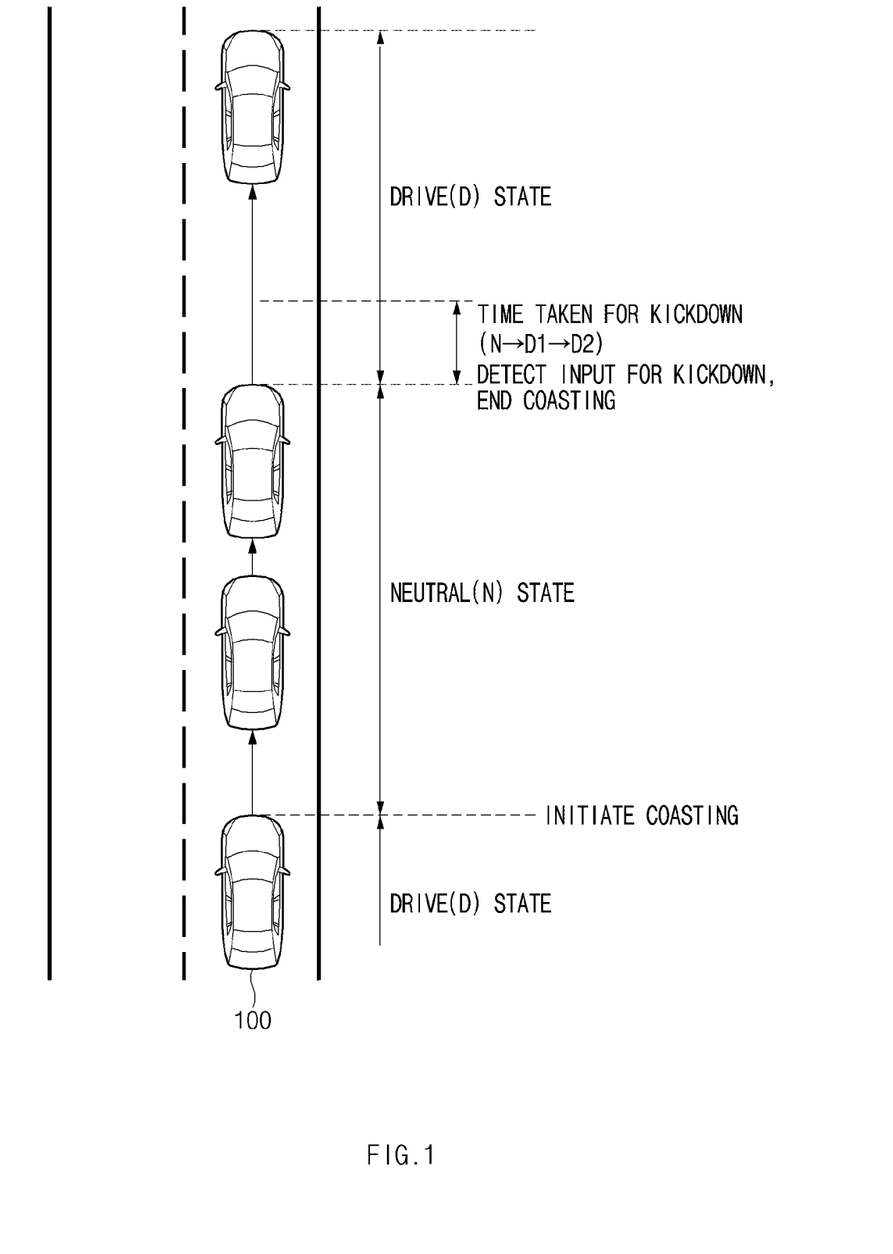
FIG. 1 is a view illustrating an operating environment of a shift control apparatus for a vehicle according to an exemplary embodiment of the present disclosure.

FIG. 1 is a view illustrating an operating environment of a shift control apparatus for a vehicle according to an exemplary embodiment of the present disclosure.

Referring to FIG. 1, a vehicle 100 according to an exemplary embodiment may be travelling on a road. A transmission of the vehicle 100 may be in a drive state D during the travel of the vehicle 100. The vehicle 100 may initiate coasting (or neutral coasting control) for an improvement in fuel economy of the vehicle 100 when a driver does not apply an input to an accelerator pedal and a brake pedal in the drive state D. When the coasting is initiated, the vehicle 100 may shift the transmission from the drive state D to a neutral state N while maintaining the position of a selector lever.

The driver may apply an input to the accelerator pedal during the coasting. When the input is applied to the accelerator pedal, the vehicle 100 may perform a decision about kickdown, based on an input pattern for the accelerator pedal. The term "kickdown" refers to, e.g., a downshift in an automatic transmission triggered when a driver presses an accelerator. When the input for the kickdown is detected, the vehicle 100 may end the coasting and may shift the transmission to a drive state D. Specifically, the vehicle 100 may shift the transmission from the neutral state N to a high gear D1 (e.g., fifth gear) (hereinafter, referred to as an N-D shift for convenience of description) and may shift the transmission from the high gear D1 to a low gear D2 (e.g., fourth gear) (hereinafter, referred to as a kickdown shift for convenience of description). That is, the two shifts (N→D1→D2) are required for acceleration. Therefore, the acceleration responsiveness of the vehicle 100 may be significantly deteriorated when the kickdown occurs during the coasting.

The vehicle 100 according to an exemplary embodiment of the present disclosure, when the kickdown occurs during the coasting, may correct an oil pressure for release of a clutch, thereby reducing time taken for the kickdown shift, which in turn improves the acceleration responsiveness of the vehicle 100. Specific operations for improving the acceleration responsiveness of the vehicle 100 will be described below in detail with reference to FIGS. 2 to 5.

Figure 2:
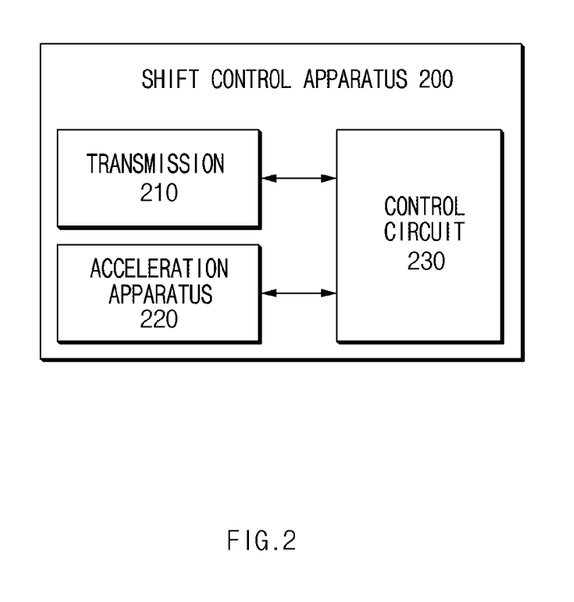
FIG. 2 is a block diagram illustrating a configuration of a shift control apparatus for a vehicle according to an exemplary embodiment of the present disclosure.

FIG. 2 is a block diagram illustrating a configuration of a shift control apparatus for a vehicle according to an exemplary embodiment of the present disclosure.

Referring to FIG. 2, the shift control apparatus 200 for the vehicle according to an exemplary embodiment of the present disclosure may include a transmission 210, an acceleration apparatus 220, and control circuit 230. The shift control apparatus 200 may be equipped in the vehicle.

The transmission 210 may include an input shaft, a gear set, an output shaft, one or more valves, a clutch, and the like. States of the transmission 210 may be switched according to an input of a driver and/or control of the control circuit 230.

The acceleration apparatus 220 may be configured to control acceleration of the vehicle. The acceleration apparatus 220 may include, for example, an accelerator pedal, a throttle, an actuator that operates in conjunction with the throttle, and/or a controller that controls the actuator. The acceleration apparatus 220 may be controlled by the driver and/or a system.

The control circuit 230 may be electrically connected with the transmission 210 and the acceleration apparatus 220. The control circuit 230 may control the transmission 210 and the acceleration apparatus 220 and may perform various data processing and computation. The control circuit 230 may include, for example, an Electronic Control Unit (ECU), a Transmission Control Unit (TCU), a Micro Controller Unit (MCU), and/or a low-level controller that are equipped in the vehicle.

According to an exemplary embodiment of the present disclosure, the control circuit 230 may shift the transmission 210 from a drive state D to a neutral state N when an activation condition for coasting is satisfied during travel of the vehicle. The control circuit 230 may detect an input to the accelerator pedal or the brake pedal by the driver in the drive state D. When no input by the driver is detected, the control circuit 230 may remove resistance by an engine and may shift the transmission 210 to the neutral state N to improve fuel economy.

According to an exemplary embodiment, the control circuit 230 may detect an input of the driver for kickdown through the acceleration apparatus 220 during the coasting. According to an exemplary embodiment, the control circuit 230 may determine whether the input to the acceleration apparatus 220 is an operation for the kickdown, based on an input pattern for the acceleration apparatus 220. The control circuit 230 may determine whether an input of the driver to the accelerator pedal is an operation for the kickdown, based on the position of the accelerator pedal, the speed of the vehicle, and the like. For example, when the driver depresses the accelerator pedal to a position lower than that corresponding to the speed of the vehicle, the control circuit 230 may determine that the input to the accelerator pedal is an operation for the kickdown. When the input for the kickdown is detected during the coasting, the control circuit 230 may change a bit for determining whether to correct an oil pressure, for example, from a bit-off state to a bit-on state. Thereafter, based on the bit, the control circuit 230 may determine whether to correct the oil pressure.

According to an exemplary embodiment, when the driver's input for the kickdown is detected through the acceleration apparatus 220 during the coasting, the control circuit 230 may correct the oil pressure for release of the clutch in the transmission 210 when performing a kickdown shift. The control circuit 230 may correct the oil pressure to reduce a shift time when performing the kickdown shift. When the kickdown occurs during the coasting, the transmission 210 may perform an N-D shift (e.g., a shift from the neutral state to a drive state) and may thereafter perform a kickdown shift (e.g., a shift from fifth gear to fourth gear). The control circuit 230 may correct the oil pressure to reduce time taken for the kickdown shift.

According to an exemplary embodiment, the control circuit 230 may adjust the oil pressure for release of the clutch to be different from the oil pressure for kickdown in the case where coasting is deactivated. For example, the control circuit 230 may correct the oil pressure to be lower than a specified level (e.g., the oil pressure for kickdown in the case where coasting is deactivated) when performing the kickdown shift during the coasting. For the correction of the oil pressure, the control circuit 230 may correct a control duty for control of the oil pressure to be lower than a specified level (e.g., a control duty for kickdown in the case where coasting is deactivated) when performing the kickdown shift. An example of reducing time taken for a kickdown shift by decreasing a control duty will be described below in detail with reference to FIG. 3.

According to an exemplary embodiment of the present disclosure, when the input for the kickdown is detected during the coasting, the control circuit 230 may prohibit learning associated with the kickdown. When the kickdown occurs during the coasting, data obtained may not be suitable for the learning associated with the kickdown. When learning is performed using the data obtained, faulty learning may be performed. The learning refers to predicting kickdown condition based on the data obtained when the kickdown occurs. Therefore, the control circuit 230 may prevent faulty learning by prohibiting learning when the kickdown occurs during the coasting.

Figure 3:
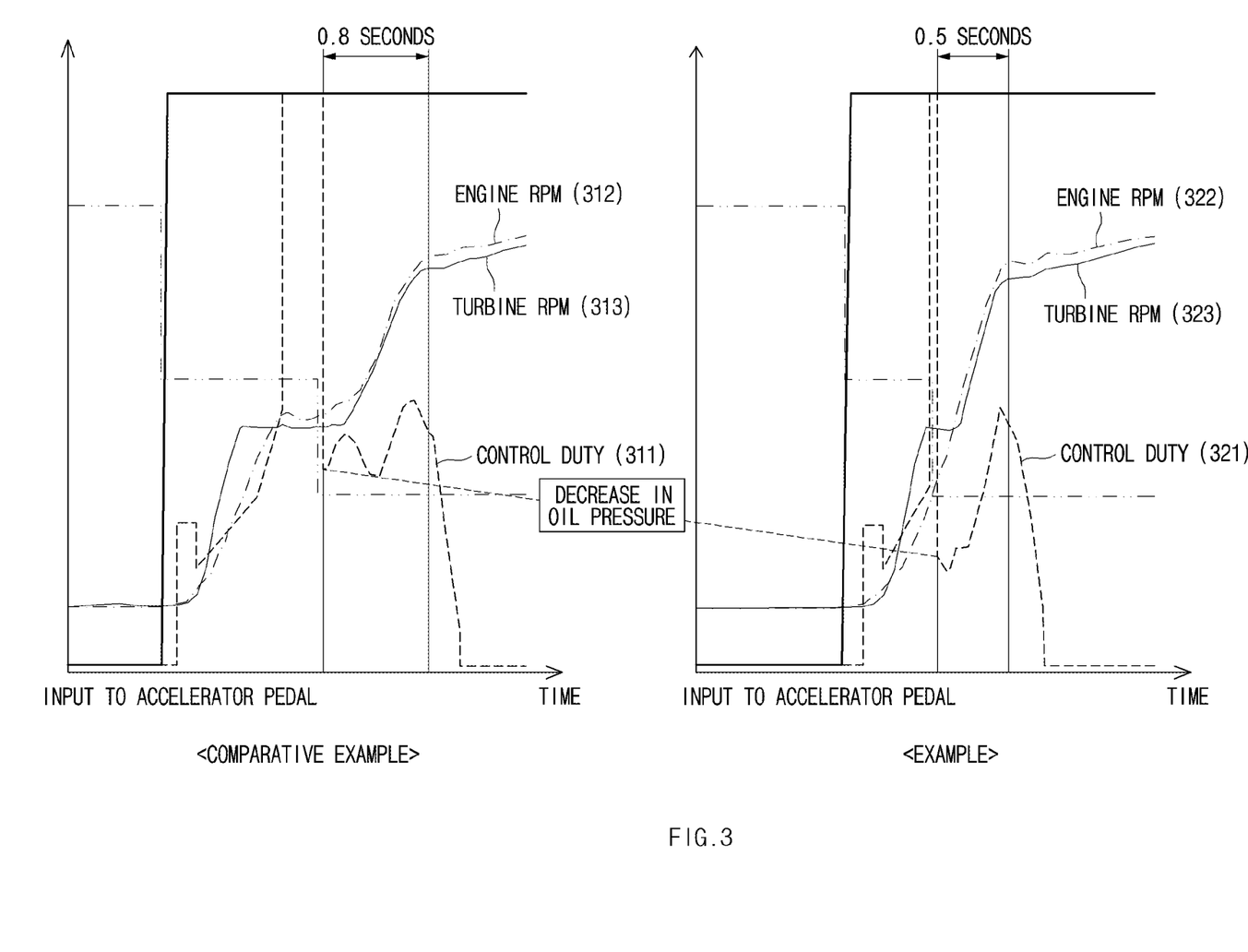
FIG. 3 is a graph illustrating an exemplary operation of the shift control apparatus according to an exemplary embodiment of the present disclosure.

FIG. 3 is a graph illustrating an exemplary operation of the shift control apparatus according to an exemplary embodiment of the present disclosure.

Referring to FIG. 3, a vehicle according to an exemplary embodiment of the present disclosure, when performing a kickdown shift during neutral coasting control, may correct a control duty to reduce time taken for the kickdown shift. The vehicle may shift the transmission from a neutral state to a drive state when an input to the accelerator pedal is detected during the neutral coasting control.

According to a comparative example, a control duty 311 may be lowered to a specified level when the kickdown shift is performed. The oil pressure of the clutch may be controlled according to the control duty 311, and the transmission of the vehicle may be shifted from a relatively high gear to a relatively low gear. Time taken for the kickdown shift may be, for example, 0.8 seconds. An engine RPM 312 and a turbine RPM 313 may increase according to the shift, and acceleration desired by a driver may be performed. When the control duty 311 is lowered to the specified level, the time taken for the kickdown shift increases so that acceleration responsiveness is deteriorated. Therefore, the control duty 311 needs to be corrected.

According to an exemplary embodiment of the present disclosure, a control duty 321 may be lowered to a level lower than the specified level when a kickdown shift is performed. The vehicle, when performing the kickdown shift during the coasting, may correct the control duty 321 to be lower than the control duty 311 when the usual kickdown shift is performed. The oil pressure of the clutch may be controlled according to the control duty 321, and the transmission of the vehicle may be shifted from a relatively high gear to a relatively low gear. Due to the correction of the control duty 321, the time taken for the kickdown shift may be reduced, for example, from 0.8 seconds to 0.5 seconds. With the reduction in the time taken for the kickdown shift, an engine RPM 322 and a turbine RPM 323 may more rapidly increase, and acceleration desired by the driver may be more rapidly performed. As described above, the acceleration responsiveness of the vehicle may be improved due to the correction of the control duty 321.

Figure 4:
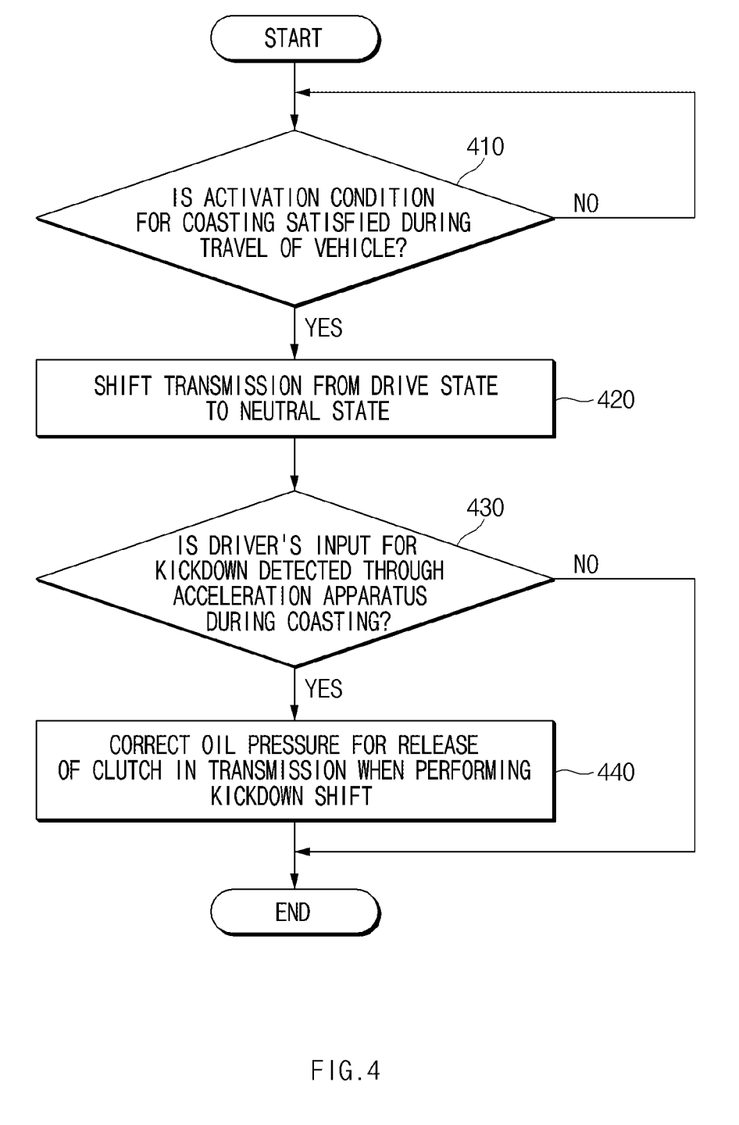
FIG. 4 is a flowchart illustrating a shift control method for a vehicle according to an exemplary embodiment of the present disclosure.

FIG. 4 is a flowchart illustrating a shift control method for a vehicle according to an exemplary embodiment of the present disclosure.

Hereinafter, it is assumed that a vehicle including the shift control apparatus 200 of FIG. 2 performs the process of FIG. 4. Furthermore, it may be understood that operations described as being performed by the vehicle in the description of FIG. 4 are controlled by the control circuit 230 of the shift control apparatus 200.

Referring to FIG. 4, in step 410, the vehicle may determine whether an activation condition for coasting is satisfied during travel of the vehicle. For example, when a driver does not apply an input to the accelerator pedal or the brake pedal during the travel of the vehicle, the vehicle may determine that the activation condition for the coasting is satisfied.

When the activation condition for the coasting is satisfied, the vehicle may, in step 420, shift the transmission from the drive state to a neutral state. For example, for the activation of the coasting, the vehicle may shift the transmission to the neutral state while the position of the selector lever is maintained.

In step 430, the vehicle may determine whether an input of the driver for kickdown is detected through the acceleration apparatus during the coasting. For example, the vehicle may detect an input of the driver to the accelerator pedal. When the driver depresses the accelerator pedal to a position lower than a specified position, the vehicle may determine the input to the accelerator pedal to be the input for the kickdown.

When the driver's input for the kickdown is detected during the coasting, the vehicle may, in step 440, correct the oil pressure for release of the clutch in the transmission when performing a kickdown shift. For example, when the vehicle shifts the transmission from a high gear to a low gear after shifting the transmission from the neutral state to a drive state, the vehicle may correct the oil pressure for release of the clutch to be lower than the oil pressure when a usual kickdown shift is performed (e.g., when a kickdown shift is performed in the case where an input for kickdown is detected in a drive state of the transmission). The vehicle may correct a control duty for controlling the oil pressure.

Figure 5:
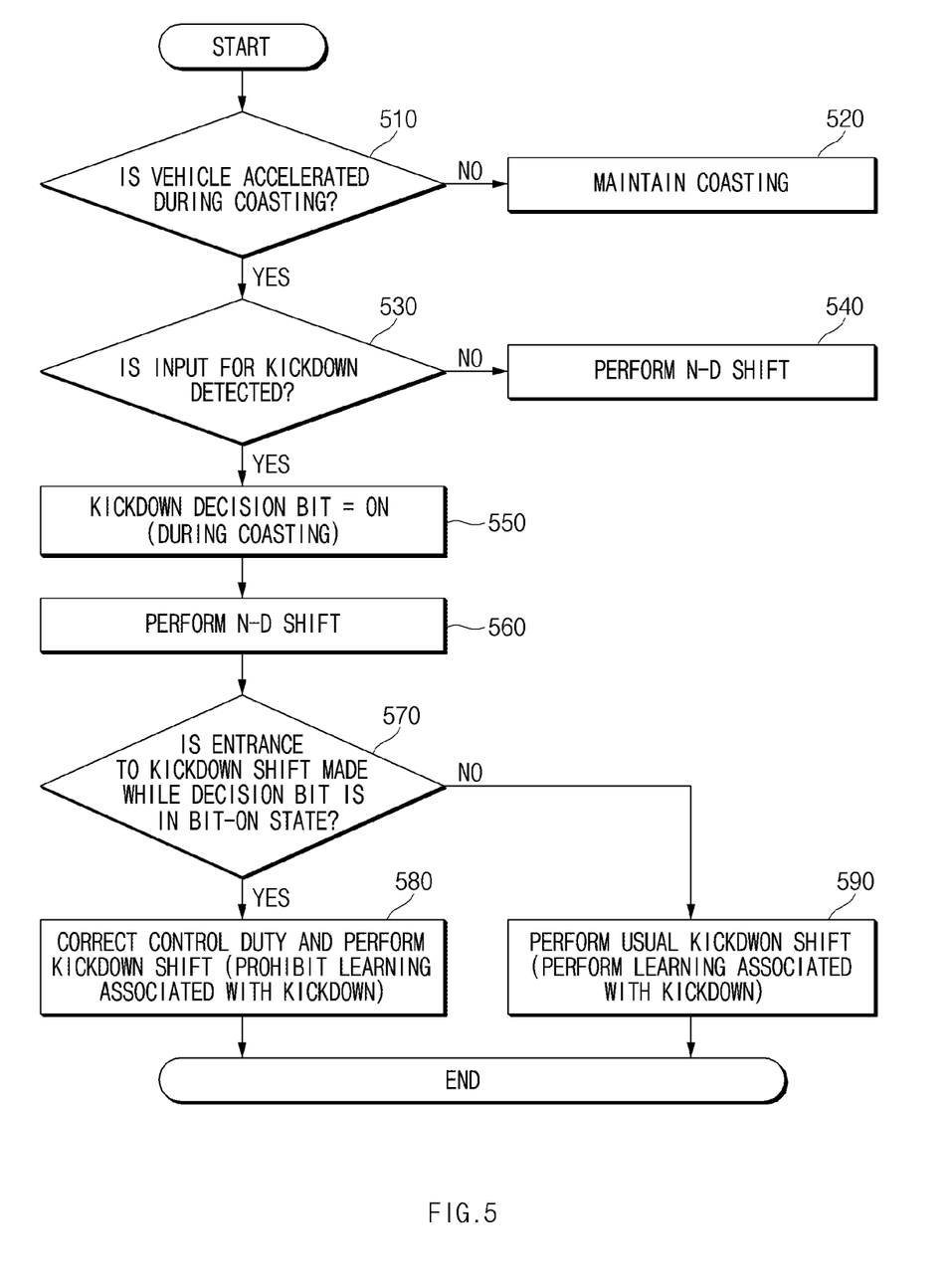
FIG. 5 is a flowchart illustrating a shift control method for a vehicle according to an exemplary embodiment of the present disclosure.

FIG. 5 is a flowchart illustrating a shift control method for a vehicle according to an exemplary embodiment of the present disclosure.

Hereinafter, it is assumed that a vehicle including the shift control apparatus 200 of FIG. 2 performs the process of FIG. 5. Furthermore, it may be understood that operations described as being performed by the vehicle in the description of FIG. 5 are controlled by the control circuit 230 of the shift control apparatus 200.

Referring to FIG. 5, in step 510, the vehicle may determine whether the vehicle is accelerated during neutral coasting control. For example, the vehicle may detect an input to the accelerator pedal by a driver during the neutral coasting control.

When there is no acceleration during the neutral coasting control, the vehicle may, in step 520, maintain the neutral coasting control. For example, the vehicle may maintain the neutral state of the transmission.

When there is acceleration during the neutral coasting control, the vehicle may, in step 530, determine whether an input for kickdown is detected. For example, the vehicle may determine whether the input to the accelerator pedal that is detected in step 510 corresponds to the input for the kickdown.

When no input for the kickdown is detected, the vehicle may, in step 540, perform an N-D shift. For example, the vehicle may shift the transmission from the neutral state to a drive state.

When the input for the kickdown is detected, the vehicle may, in step 550, switch a decision bit representing whether the kickdown occurs during the neutral coasting control, to a bit-on state. The decision bit may be data that represents whether the kickdown occurs during the neutral coasting control or whether usual kickdown occurs.

In step 560, the vehicle may perform an N-D shift. For example, the vehicle may shift the transmission from the neutral state to a drive state. The vehicle may perform a kickdown shift as follows after performing the N-D shift.

In step 570, the vehicle may determine whether an entrance to the kickdown shift is made while the decision bit is in the bit-on state. For example, the vehicle may recognize the state of the decision bit when performing the kickdown shift after the N-D shift.

When the entrance to the kickdown shift is made while the decision bit is in the bit-on state, the vehicle may, in step 580, correct a control duty and perform the kickdown shift. For example, to improve the speed of the kickdown shift, the vehicle may lower a control duty for controlling the oil pressure of the clutch. The lowered control duty may be set in advance. In this case, to prevent faulty learning, the vehicle may prohibit learning associated with the kickdown.

When an entrance to a kickdown shift is made while the decision bit is in a bit-off state, the vehicle may, in step 590, perform a usual kickdown shift. For example, the vehicle may use a specified usual control duty without correcting the control duty. The usual control duty may be set in advance. In this case, the vehicle may perform learning associated with the kickdown because normal learning is possible.

Figure 6A:
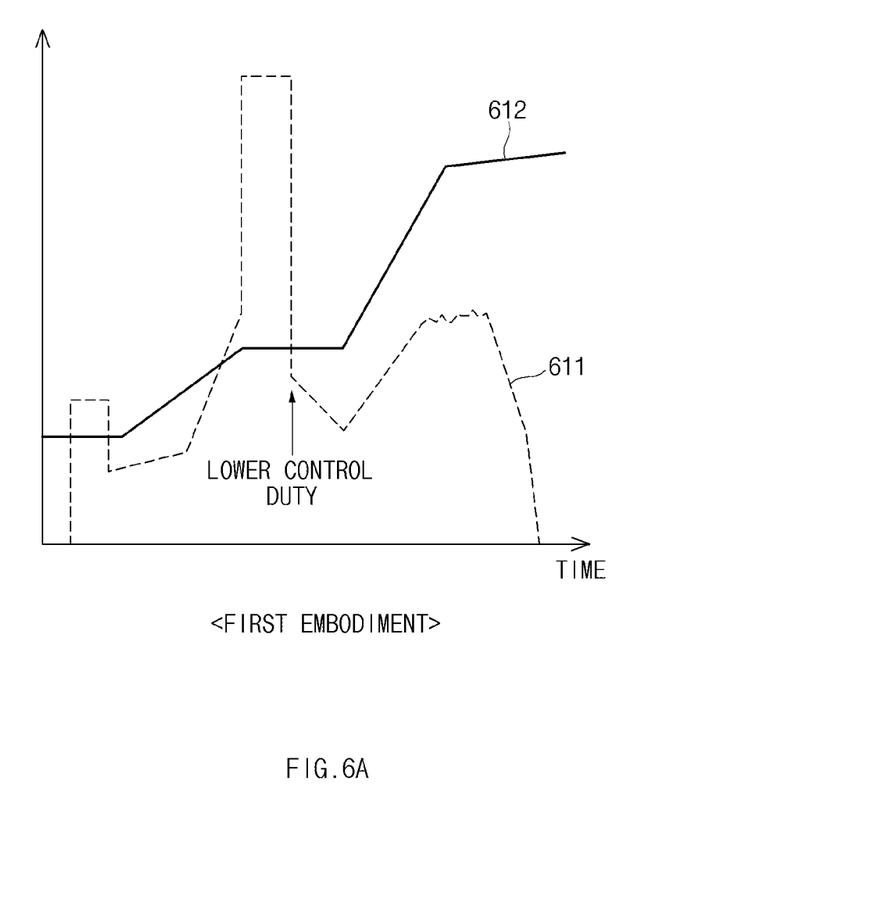
FIGS. 6A and 6B are graphs illustrating an exemplary operation of the shift control apparatus according to an exemplary embodiment of the present disclosure.
Figure 6B:
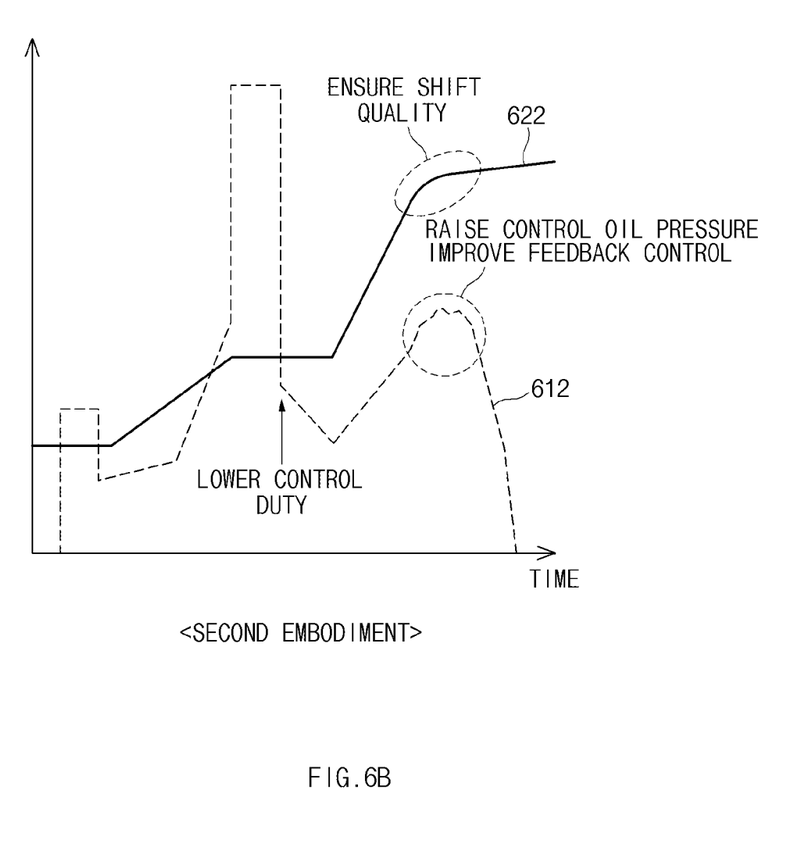

FIGS. 6A and 6B are graphs illustrating an exemplary operation of the shift control apparatus according to an exemplary embodiment of the present disclosure.

Referring to FIG. 6A, according to a first embodiment, a control duty 611 may be lowered when a kickdown shift is performed. The vehicle, when performing the kickdown shift during coasting, may correct the control duty 611 to be lower than the control duty when a usual kickdown shift is performed. The oil pressure of the clutch may be controlled according to the control duty 611, and the transmission of the vehicle may be shifted from a high gear to a low gear. Time taken for the kickdown shift may be reduced due to the correction of the control duty 611.

Referring to FIG. 6B which illustrates a second embodiment, in the case where a control duty 621 is lowered when a kickdown shift is performed, the control duty 621 may be higher than the control duty 611 according to the first embodiment at a shift synchronization point. The overall shift speed may be increased due to the decrease of the control duty 621 at the time of the kickdown shift, and run-up and impact by the run-up may occur at the shift synchronization point due to the increase of the shift speed. To solve the problem caused by the run-up, the vehicle may correct the control duty 621 to increase control of an oil pressure in the vicinity of the shift synchronization point. Furthermore, the vehicle may change a target turbine RPM variation and a Proportional-Integral-Derivative (PID) control gain to improve feedback control. Accordingly, a turbine RPM 622 in the vicinity of the shift synchronization point in the second embodiment may be more smoothly changed than a turbine RPM 612 in the vicinity of the shift synchronization point in the first embodiment, and the shift quality of the vehicle may be improved.

Figure 7:
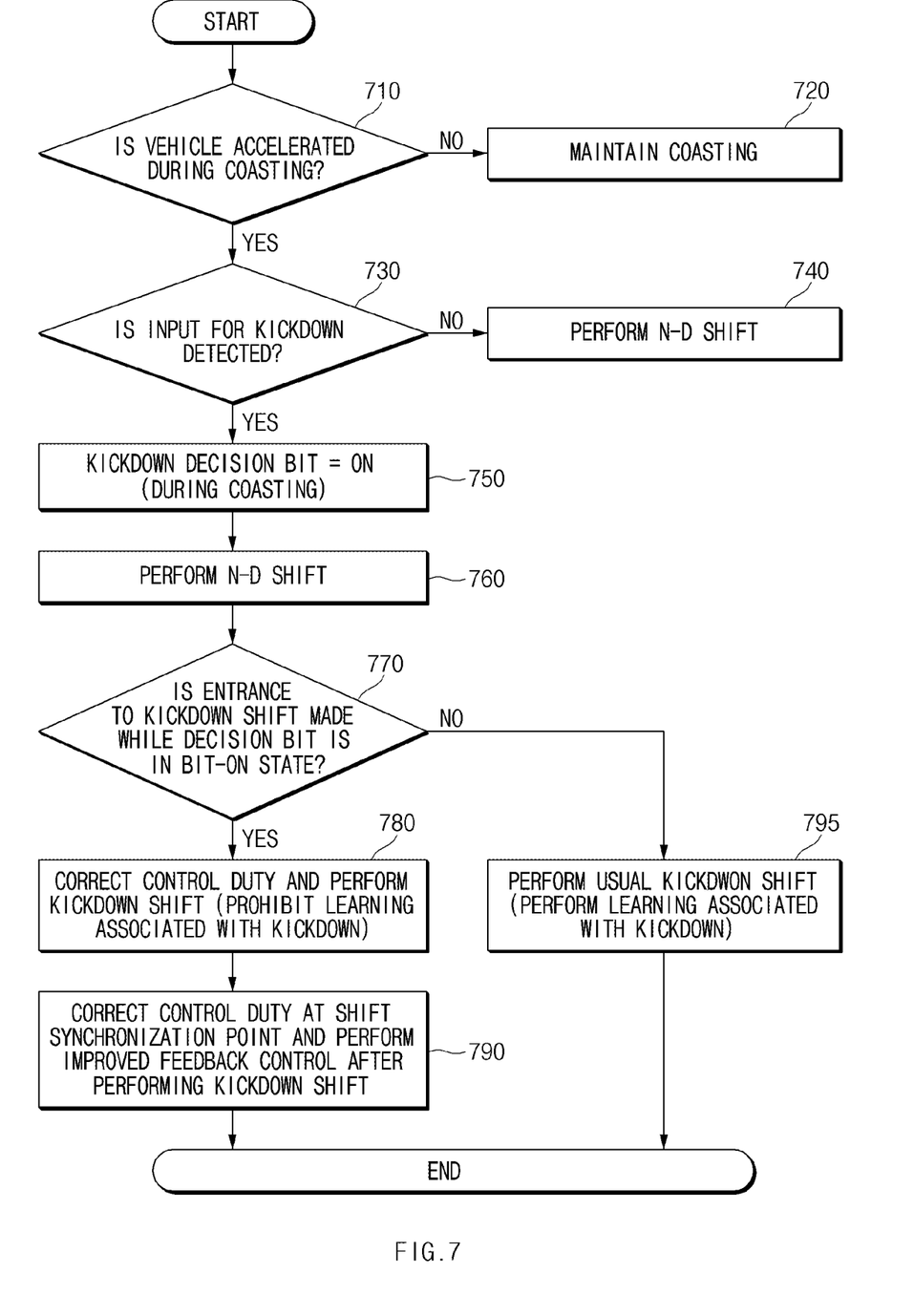
FIG. 7 is a flowchart illustrating a shift control method for a vehicle according to an exemplary embodiment of the present disclosure.

FIG. 7 is a flowchart illustrating a shift control method for a vehicle according to an exemplary embodiment of the present disclosure.

Hereinafter, it is assumed that a vehicle including the shift control apparatus 200 of FIG. 2 performs the process of FIG. 7. Furthermore, it may be understood that operations described as being performed by the vehicle in the description of FIG. 7 are controlled by the control circuit 230 of the shift control apparatus 200.

Referring to FIG. 7, in step 710, the vehicle may determine whether the vehicle is accelerated during neutral coasting control. When there is no acceleration during the neutral coasting control, the vehicle may, in step 720, maintain the neutral coasting control. When there is acceleration during the neutral coasting control, the vehicle may, in step 730, determine whether an input for kickdown is detected. When no input for the kickdown is detected, the vehicle may, in step 740, perform an N-D shift. When the input for the kickdown is detected, the vehicle may, in step 750, switch a decision bit representing whether the kickdown occurs during the neutral coasting control, to a bit-on state. In step 760, the vehicle may perform an N-D shift. In step 770, the vehicle may determine whether an entrance to a kickdown shift is made while the decision bit is in the bit-on state. When the entrance to the kickdown shift is made while the decision bit is in the bit-on state, the vehicle may, in step 780, correct a control duty and perform the kickdown shift.

In step 790, the vehicle, after performing the kickdown shift, may correct the control duty at a shift synchronization point and may perform improved feedback control. For example, the vehicle, after performing the kickdown shift, may correct the control duty to increase the oil pressure at the shift synchronization point. Furthermore, for the improved feedback control, the vehicle may change a target turbine RPM variation and a PID control gain.

When an entrance to a kickdown shift is made while the decision bit is in a bit-off state, the vehicle may, in step 795, perform a usual kickdown shift.

The present disclosure may improve gear-shift responsiveness by correcting an oil pressure for release of a clutch when kickdown occurs during coasting of a vehicle.

Furthermore, the present disclosure may prevent performance of faulty learning by prohibiting learning associated with kickdown when the kickdown is performed during coasting.

In addition, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for shift control of a vehicle, the apparatus comprising:
    a transmission;
    an acceleration apparatus; and
    a control circuit electrically connected with the transmission and the acceleration apparatus,
    wherein the control circuit is configured to:
        shift the transmission from a drive state to a neutral state when an activation condition for coasting is satisfied during travel of the vehicle,
        determine whether a driver's input to the acceleration apparatus is an operation for a kickdown, based on an input pattern for the acceleration apparatus, and
        correct an oil pressure for release of a clutch in the transmission at the time of a kickdown shift, when the driver's input for the kickdown is detected through the acceleration apparatus during the coasting.

2. The apparatus of claim 1, wherein the control circuit changes a bit which is for determining whether to correct the oil pressure, when the driver's input for the kickdown is detected during the coasting.

3. The apparatus of claim 1, wherein the control circuit corrects the oil pressure to reduce a shift time when performing the kickdown shift.

4. The apparatus of claim 1, wherein the control circuit adjusts the oil pressure to be different from an oil pressure for the kickdown when the coasting is deactivated.

5. The apparatus of claim 1, wherein the control circuit corrects the oil pressure to be lower than a specified level, when performing the kickdown shift.

6. The apparatus of claim 1, wherein the control circuit corrects a control duty for control of the oil pressure to be lower than a specified level, when performing the kickdown shift.

7. The apparatus of claim 1, wherein the control circuit prohibits learning associated with the kickdown, when the driver's input for the kickdown is detected during the coasting.

8. The apparatus of claim 1, wherein the control circuit corrects the oil pressure at a shift synchronization point after performing the kickdown shift.

9. The apparatus of claim 1, wherein the control circuit corrects a control duty for control of the oil pressure to be higher than a specified level at a shift synchronization point, after performing the kickdown shift.

10. The apparatus of claim 1, wherein the control circuit corrects a target turbine revolutions-per-minute (RPM) variation and a Proportional-Integral-Derivative (PID) control gain for feedback control at a shift synchronization point, after performing the kickdown shift.

11. A method for shift control of a vehicle, the method comprising:
    shifting a transmission from a drive state to a neutral state when an activation condition for coasting is satisfied during travel of the vehicle;
    determining whether a driver's input to an acceleration apparatus is an operation for a kickdown, based on an input pattern for the acceleration apparatus; and
    correcting an oil pressure for release of a clutch in the transmission at the time of a kickdown shift, when the driver's input for the kickdown is detected through the acceleration apparatus during the coasting.

12. The method of claim 11, wherein the correcting an oil pressure includes correcting the oil pressure to reduce a shift time when performing the kickdown shift.

13. The method of claim 11, wherein the correcting an oil pressure includes adjusting the oil pressure to be different from an oil pressure for the kickdown when the coasting is deactivated.

14. The method of claim 11, wherein the correcting an oil pressure includes correcting the oil pressure to be lower than a specified level, when performing the kickdown shift.

15. The method of claim 11, wherein the correcting an oil pressure includes correcting a control duty for control of the oil pressure to be lower than a specified level, when performing the kickdown shift.

16. The method of claim 11, further comprising prohibiting learning associated with the kickdown, when the driver's input for the kickdown is detected during the coasting.

17. The method of claim 11, further comprising correcting the oil pressure at a shift synchronization point after performing the kickdown shift.

18. The method of claim 11, further comprising correcting a target turbine revolutions-per-minute (RPM) variation and a Proportional-Integral-Derivative (PID) control gain for feedback control at a shift synchronization point, after performing the kickdown shift.

* * * * *